(12) United States Patent
Nakase et al.

(10) Patent No.: US 10,095,059 B2
(45) Date of Patent: Oct. 9, 2018

(54) LCD MODULE

(71) Applicant: Panasonic Intellectual Property Management Co., Ltd., Osaka (JP)

(72) Inventors: Kiyotaka Nakase, Osaka (JP); Hideki Kasamatsu, Osaka (JP); Akira Mizuno, Osaka (JP); Yasunori Miura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 77 days.

(21) Appl. No.: 15/414,584

(22) Filed: Jan. 24, 2017

(65) Prior Publication Data

US 2017/0131588 A1    May 11, 2017

Related U.S. Application Data

(63) Continuation of application No. PCT/JP2015/002853, filed on Jun. 8, 2015.

(30) Foreign Application Priority Data

Aug. 7, 2014  (JP) ................................ 2014-161120
Oct. 30, 2014  (JP) ................................ 2014-221074

(51) Int. Cl.
*G02F 1/1333*    (2006.01)

(52) U.S. Cl.
CPC ............ *G02F 1/133308* (2013.01); *G02F 2001/133317* (2013.01); *G02F 2001/133322* (2013.01); *G02F 2201/503* (2013.01)

(58) Field of Classification Search
None
See application file for complete search history.

(56) References Cited

U.S. PATENT DOCUMENTS 9,699,279 B2 *   7/2017   Lee ..................... H04B 1/3888
2005/0078469 A1 *   4/2005   Jeong ................. G02B 6/0088
                                                                     362/633

(Continued)

FOREIGN PATENT DOCUMENTS

JP    7-168161     7/1995
JP    2010-152360  7/2010
KR    2006-010387  2/2006

OTHER PUBLICATIONS

International Search Report of PCT application No. PCT/JP2015/002853 dated Aug. 18, 2015.

(Continued)

*Primary Examiner* — Dennis Y Kim
(74) *Attorney, Agent, or Firm* — McDermott Will & Emery LLP

(57) ABSTRACT

The LCD module according to the present disclosure includes a liquid crystal cell and a mold frame accommodating the liquid crystal cell. The mold frame includes a support supporting the liquid crystal cell in a thickness direction of the liquid crystal cell and a guide for limiting movement of the liquid crystal cell in a planar direction of the liquid crystal cell. The guide includes a corner-part guide disposed to face a corner part on the corner part of at least one side of the liquid crystal cell, and an inner-part guide facing an inner part being a part of the side other than the corner part, and being adjacent to the corner-part guide with distance. A gap between the liquid crystal cell and the corner-part guide is larger than a gap between the liquid crystal cell and the inner-part guide.

6 Claims, 9 Drawing Sheets

(56) References Cited

U.S. PATENT DOCUMENTS

| | | | |
|---|---|---|---|
| 2006/0061947 A1* | 3/2006 | Chang | G02F 1/133308 |
| | | | 361/679.26 |
| 2010/0157193 A1* | 6/2010 | Park | G02F 1/133308 |
| | | | 349/58 |
| 2011/0002112 A1 | 1/2011 | Hsu et al. | |
| 2011/0310324 A1* | 12/2011 | Jang | G02F 1/1335 |
| | | | 349/58 |

OTHER PUBLICATIONS

The Extended European Search Report dated Jul. 17, 2017 for the related European Patent Application No. 15829579.0.

* cited by examiner

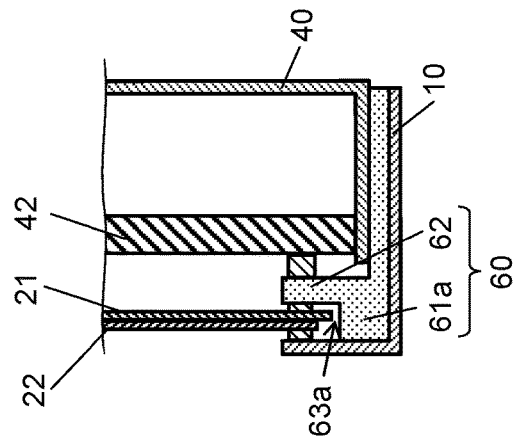
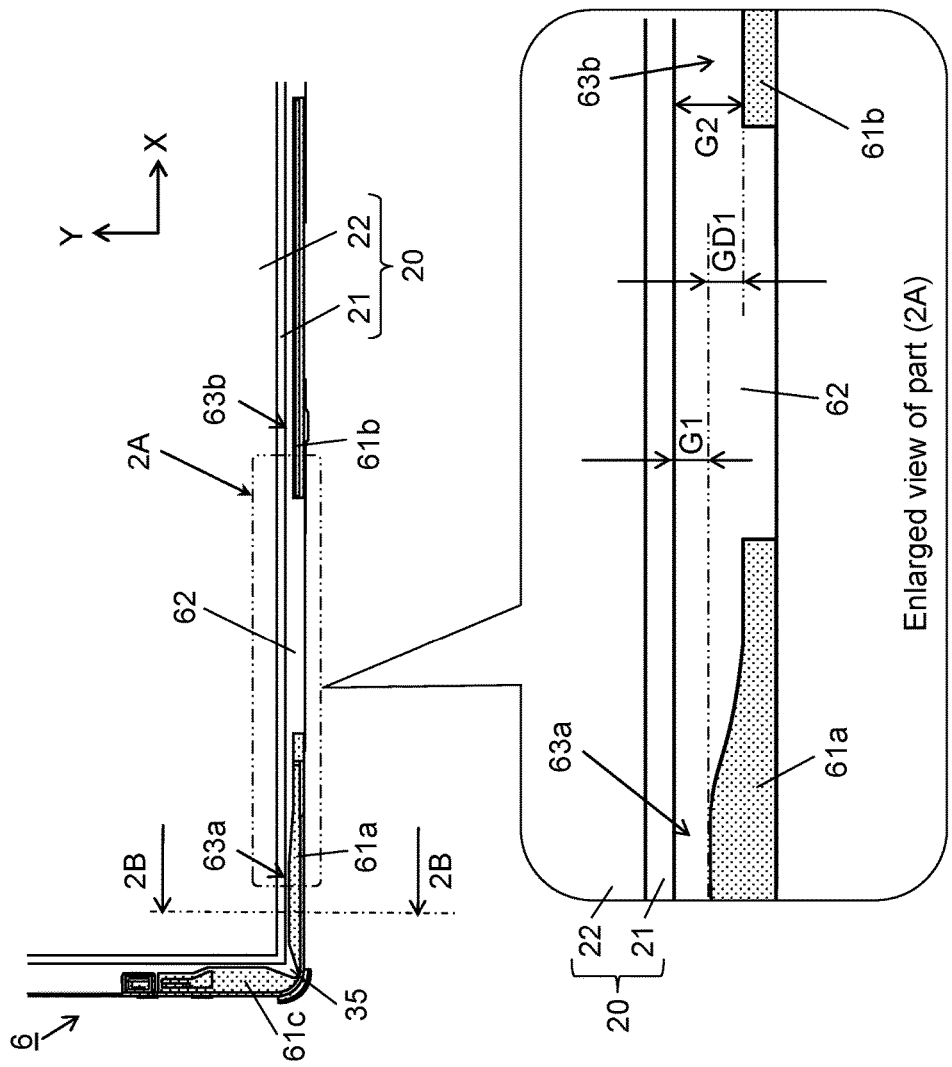
FIG. 2A
FIG. 2B

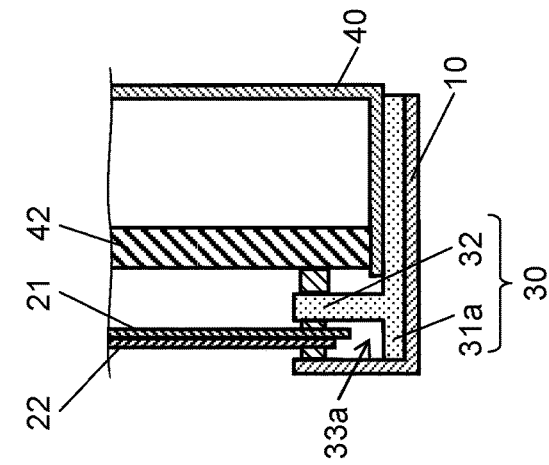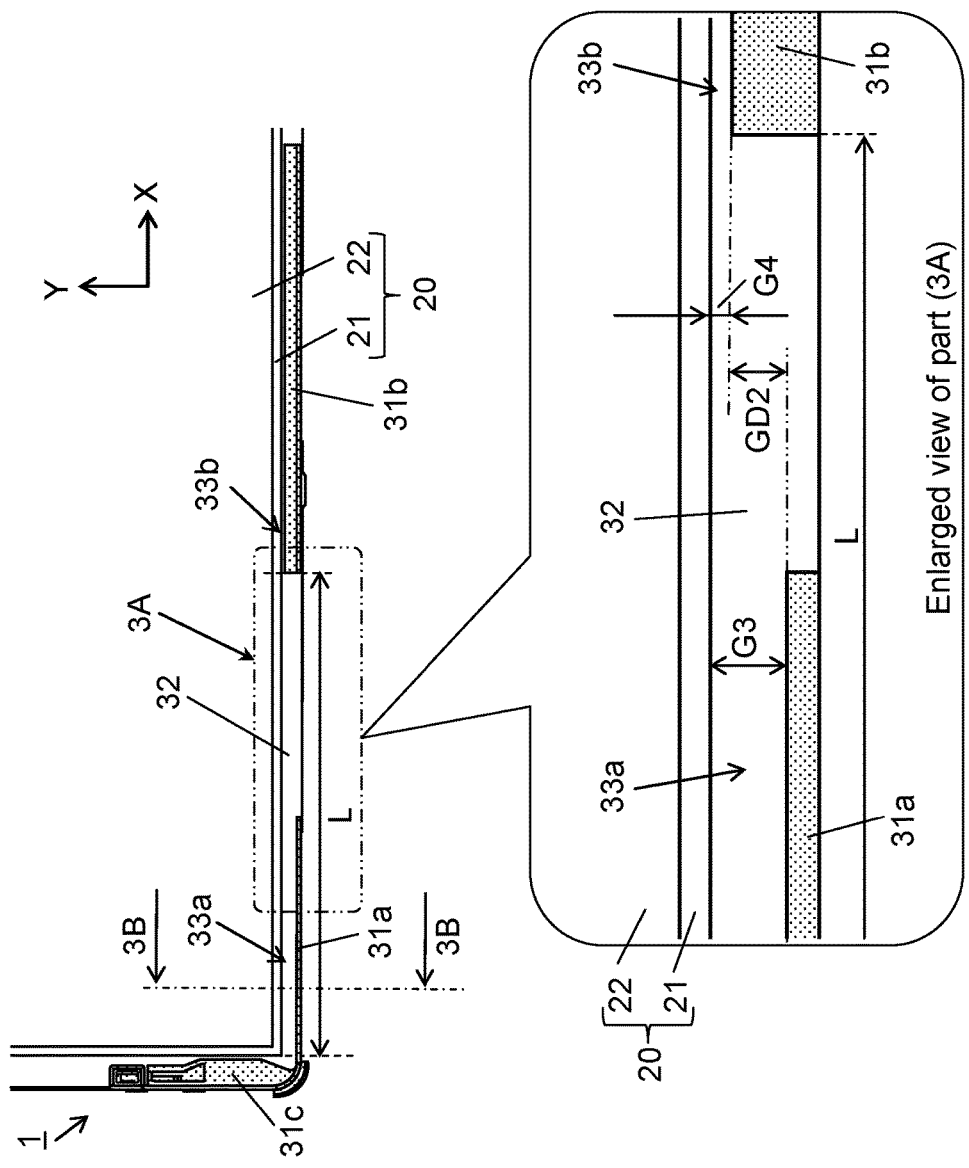

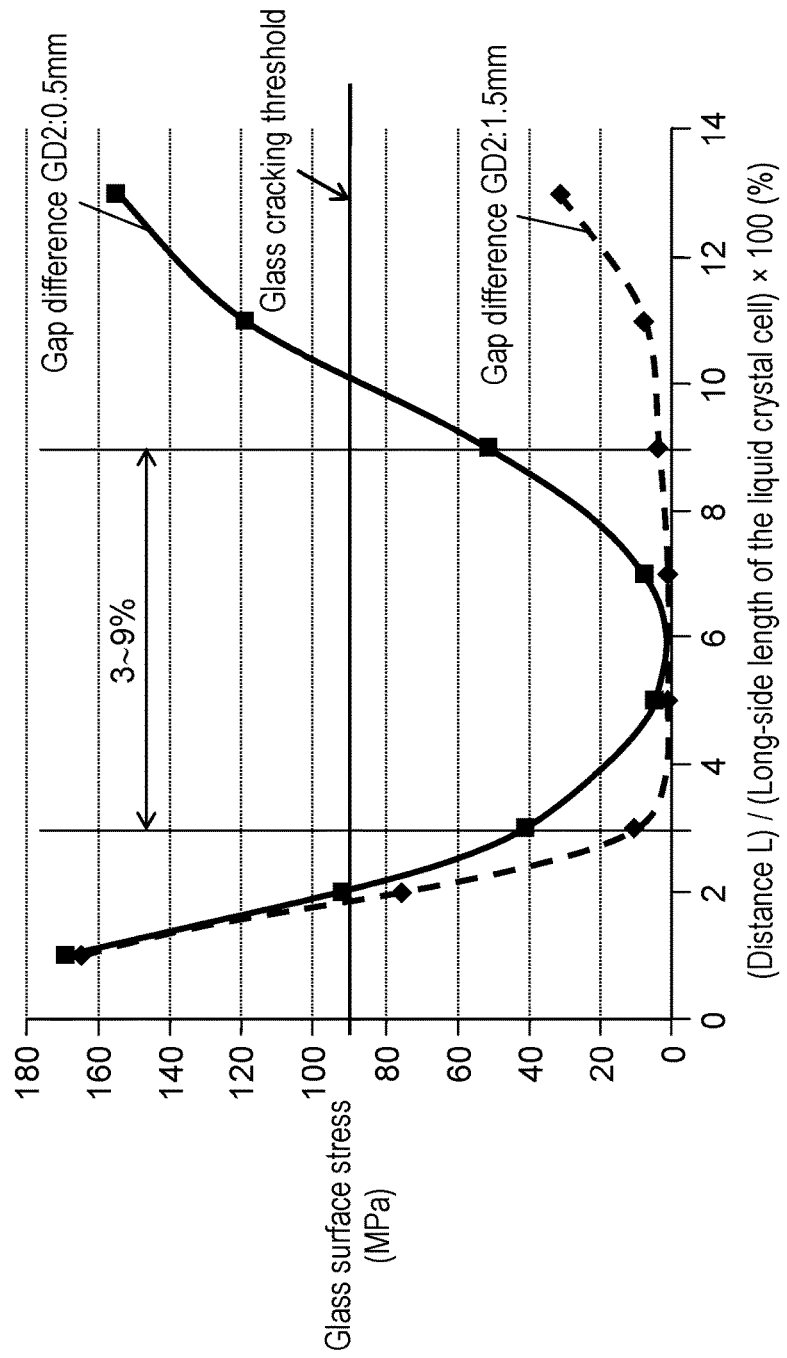

LCD MODULE

BACKGROUND

Technical Field

The present disclosure relates to the modular structure of a liquid crystal display (LCD).

Description of the Related Art

In a conventional liquid crystal display, a liquid crystal cell is fit into a support frame supporting the peripheral region of the liquid crystal cell from the rear surface. The support frame has, at its corner parts, positioning lugs (positioning members), which position the liquid crystal cell in the planar direction, while absorbing variations in the contour of the liquid crystal cell.

In the case, however, that the positioning lugs are formed at the corner parts of the frame, stress such as vibration or impact is concentrated on the corner parts of the liquid crystal cell and is likely to damage the liquid crystal cell.

In Patent Literature 1, this problem is solved by placing a buffer material made, for example, of silicon resin on the positioning members located at the corner parts. This reduces the stress such as vibration or impact applied to the liquid crystal cell in the planar direction, thereby avoiding glass cracking starting from the corner parts.

Citation List

Patent Literature

PTL: Japanese Unexamined Patent Application Publication No. 1107-168161

SUMMARY

It is an object of the present disclosure to provide an LCD module in which a liquid crystal cell is protected from glass cracking or other damage starting from its corner parts when stress such as vibration or impact is applied to the liquid crystal cell in the planar direction.

The LCD module according to the present disclosure includes a liquid crystal cell and a mold frame accommodating the liquid crystal cell. The mold frame includes a support supporting the liquid crystal cell in a thickness direction of the liquid crystal cell and a guide for limiting movement of the liquid crystal cell in a planar direction of the liquid crystal cell. The guide includes a corner-part guide disposed to face a corner part on the corner part of at least one side of the liquid crystal cell, and an inner-part guide facing an inner part being a part of the side other than the corner part, and being adjacent to the corner-part guide with distance. A gap between the liquid crystal cell and the corner-part guide is larger than a gap between the liquid crystal cell and the inner-part guide.

The LCD module according to the present disclosure is effective to protect the liquid crystal cell from glass cracking or other damage starting from its corner parts when stress such as vibration or impact is applied to the liquid crystal cell in the planar direction.

BRIEF DESCRIPTION OF THE DRAWINGS

FIG. 2A is a structural diagram of a conventional LCD module.

FIG. 2B is a schematic diagram taken along line 2B-2B of FIG. 2A.

FIG. 3A is a structural diagram of the LCD module according to the first exemplary embodiment.

FIG. 3B is a schematic diagram taken along line 3B-3B of FIG. 3A.

FIG. 4 is diagram showing the definition of a predetermined distance L.

DETAILED DESCRIPTION

Figure 1:
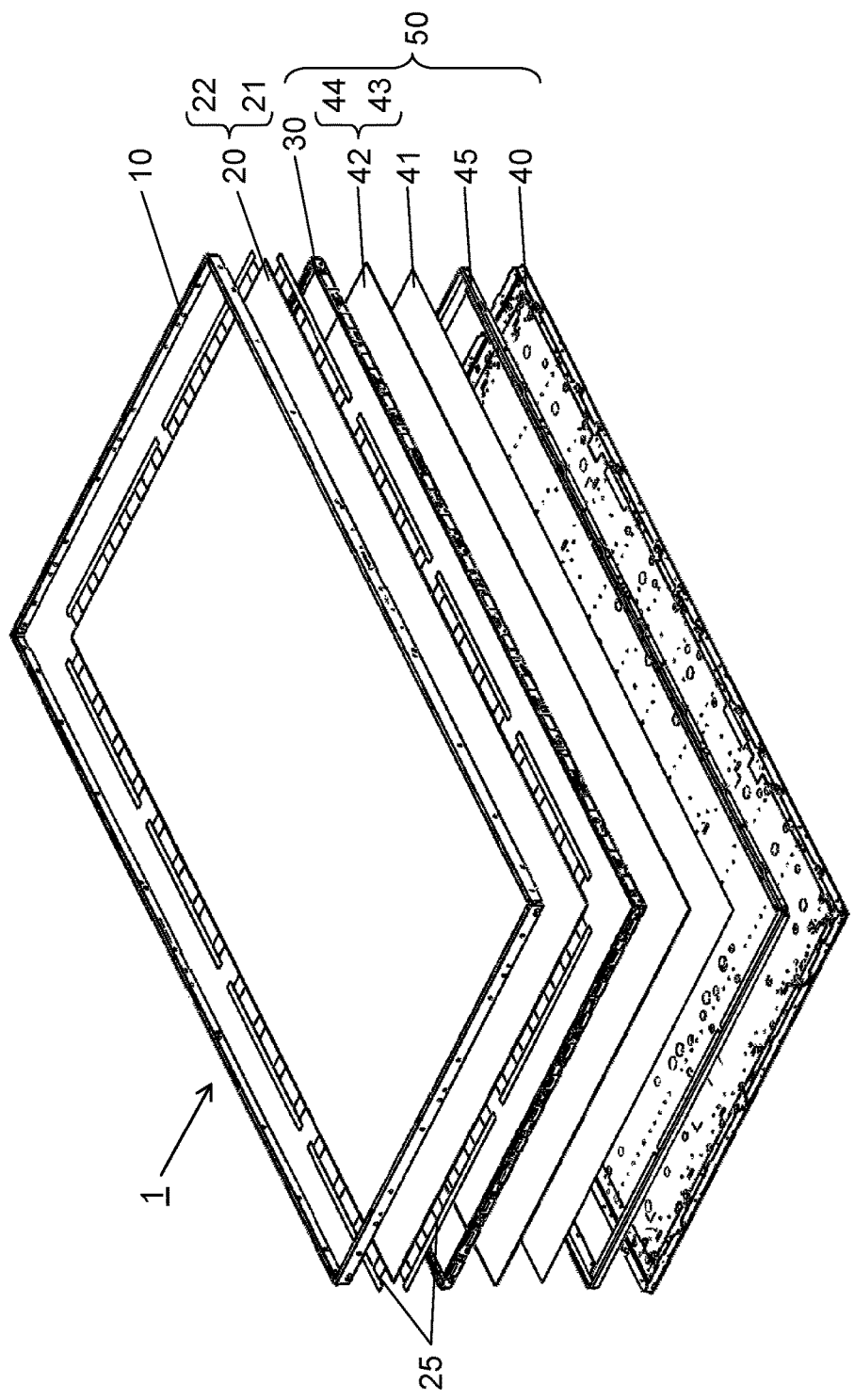
FIG. 1 is an exploded perspective view of an LCD module according to a first exemplary embodiment.

Exemplary embodiments will be described in detail as follows with reference to the accompanying drawings. However, the description of well-known matter and of substantially the same configuration as described earlier may be omitted to avoid redundancy and help those skilled in the art understand them easily.

Note that the attached drawings and the following description are provided to make those skilled in the art fully understand the present disclosure, and are not intended to limit the claim subject.

The market of LCD modules is expanding from consumer to industrial applications. In particular, those of large sizes (90 inches and greater) are increasingly used for signage applications. The larger the LCD module, the heavier the cell becomes, causing the LCD module or a device including it to suffer glass cracking or other damage by drop impact. Countermeasures against this problem will be described in the following exemplary embodiments.

First Exemplary Embodiment

A first exemplary embodiment will be described as follows with reference to FIGS. 1 through 8. In the present application, like components are labeled with like reference numerals, and the directions "top", "bottom", "left", and "right" correspond to those in the case that the LCD module is oriented with the long side horizontally and the short side vertically and is fixed to a wall surface for signage applications.

1-1. Structure

FIG. 1 is an exploded perspective view of an LCD module according to a first exemplary embodiment. LCD module 1 includes upper frame 10, liquid crystal cell 20, and backlight unit 50.

Liquid crystal cell 20 includes TFT substrate 21, color filter substrate 22 facing TFT substrate 21, and liquid crystal material (not shown) between the two substrates 21 and 22. Liquid crystal cell 20 is rectangular and includes printed circuit boards (PCB) 25 disposed on each of its four sides so as to carry a gate signal and a data signal.

Backlight unit 50 includes lower frame 40, inner frame 45, mold frame 30, a reflector plate (not shown), at least one light source 41, and optical element 42 including diffused plate 43 and at least one optical sheet 44. Optical element 42 is accommodated in lower frame 40 and is covered with mold frame 30. Inner frame 45 is a member reinforcing the four sides of LCD module 1 and positioning optical element 42. Liquid crystal cell 20 is located on the top of mold frame 30 of backlight unit 50. Upper frame 10 covers the assembly of cell 20 and backlight unit 50.

The structural features of LCD module 1 according to the present exemplary embodiment will be shown as follows by being compared with the conventional structural features.

FIG. 2A is a structural diagram of conventional LCD module 6. FIG. 2B is a schematic diagram taken along line 2B-2B of FIG. 2A. FIG. 3A is a structural diagram of LCD module 1 according to the present exemplary embodiment. FIG. 3B is a schematic diagram taken along line 3B-3B of FIG. 3A. Both FIGS. 2A and 3A show the bottom left corner part and its vicinity in the respective LCD modules. In FIGS. 2A, 2B, 3A, and 3B, liquid crystal cell 20 is located at the center in the planar direction of the respective LCD modules.

The mold frames will now be described in detail with reference to FIGS. 2A, 2B, 3A, and 3B.

As shown in FIG. 2B, conventional mold frame 60 accommodates liquid crystal cell 20 in a space defined by support (supporting part) 62, which supports cell 20 in the thickness direction of cell 20, and guide (regulating part) 61, which limits the movement of cell 20 in the planar direction of cell 20. Similarly, as shown in FIG. 3B, mold frame 30 accommodates liquid crystal cell 20 in a space defined by support (holding part) 32, which supports cell 20 in the horizontal direction, and guide 31, which limits the movement of cell 20 in the vertical direction. Each of guide 61 and guide 31 of mold frames 60 and 30, respectively, is divided into 10 to 20 guides depending on the positional relationship with PCBs 25 shown in FIG. 1.

First, the structure of conventional LCD module 6 will be described as follows. FIG. 2A shows the bottom left part of module 6 and also shows an enlarged view of part (2A) of a long side of module 6. As shown in FIG. 2A, mold frame 60 of module 6 includes guides 61a, 61b, and 61c. Guide 61a is formed at the corner part of the long side (long-side corner part), guide 61b is formed at the inner part of the long side (long-side inner part), and guide 61c is formed at the corner part of the short side (short-side corner part).

The term "long-side inner part" means a part of the long side of cell 20 other than the right- and left-corner parts. Clearance 35 is formed between the apex of the corner part of cell 20 and guides 61a, 61c. Furthermore, as shown in FIG. 2A, gap 63a is formed between cell 20 and guide 61a, and gap 63b is formed between cell 20 and guide 61b.

As shown in FIG. 2A, gap 63a has a gap length G1, and gap 63b has gap length G2. The lengths G1 and G2 have a gap difference GD1. Each of the gap lengths indicates the shortest distance between cell 20 and guide 61. For example, the gap length G1 of gap 63a is about 0.3 mm, and the gap length G2 of gap 63b is about 1.9 mm. Although FIG. 2A shows only the bottom left part, the bottom right part has the same structure.

As described above, in conventional mold frame 60, the gap at the long-side inner part has a larger gap length with respect to cell 20 than the gap at the long-side corner part. In other words, cell 20 is supported vertically by guides 61a formed at the long-side corner parts under the following relation: the gap length G1 at the long-side corner part<the gap length G2 at the long-side inner part.

If a display including conventional LCD module 6 is dropped on a hard floor, impact is applied through the display to LCD module 6 in the Y direction (the vertical direction) shown in FIG. 2A. In that case, stress can be generated at one or both of the bottom left and bottom right parts of cell 20 including TFT substrate 21 and color filter substrate 22, both of which are made of glass.

In contrast, in LCD module 1 according to the present exemplary embodiment, the gap at the long-side corner part (one or both of the bottom left and bottom right parts) is larger than the gap at the long-side inner part.

FIG. 3A shows the bottom left part of LCD module 1 according to the present exemplary embodiment and also shows an enlarged view of part (3A) of a long side of module 1. As shown in FIG. 3A, mold frame 30 of module 1 includes guides 31a, 31b, and 31c. Guide 31a is formed at the corner part of the long side (long-side corner part), guide 31b is formed at the inner part of the long side (long-side inner part), and guide 31c is formed at the corner part of the short side (short-side corner part).

As shown in FIG. 3A, gap 33a is formed between cell 20 and guide 31a at the long-side corner part, and gap 33b is formed between cell 20 and guide 31b at the long-side inner part. As shown in FIG. 3A, gap 33a has a gap length G3, and gap 33b has a gap length G4. The length G3 and G4 have a gap difference GD2. For example, the gap length G3 is about 1.8 mm, and the gap length G4 is about 0.3 mm.

Furthermore, as shown in FIG. 3A, the region extending from the apex of the corner part of cell 20 to the distance L has a gap of at least the gap length G3. In other words, the distance L extends from the apex of the corner part of cell 20 to the corner-side end of guide 31b.

Although FIG. 3A shows only the bottom left part, the bottom right part has the same structure. Furthermore, the top left and top right parts may have the same structure as the bottom right part.

FIG. 4 is a diagram showing the predetermined distance L shown in FIG. 3A. FIG. 4 shows changes in the glass surface stress with respect to the following relation: (the distance L)/(the long-side length of the liquid crystal cell), when LCD module 1 is dropped. In FIG. 4, the horizontal axis represents (the distance L)/(the long-side length of the liquid crystal cell)×100 (%), and the vertical axis represents the glass surface stress (MPa).

FIG. 4 shows the results obtained in cases where the gap difference GD2 between gap 33a at the long-side corner part and gap 33b at the long-side inner part is set to 0.5 mm and is set to 1.5 mm. The glass cracking threshold shown in FIG. 4 represents the value of the glass surface stress at or above which the liquid crystal cell may suffer cracking. The glass cracking threshold is 90 MPa in FIG. 4.

As shown in FIG. 4, the distance L is preferably 3 to 9% of the long-side length of cell 20 because in this range, the glass surface stress is below the glass cracking threshold. Outside this range, the glass surface stress approaches or exceeds the glass cracking threshold, increasing the occurrence of panel cracking.

In a 98-inch LCD module, for example, the distance L is about in the range of 65 mm to 195 mm.

1-2. Operation

Figure 5:
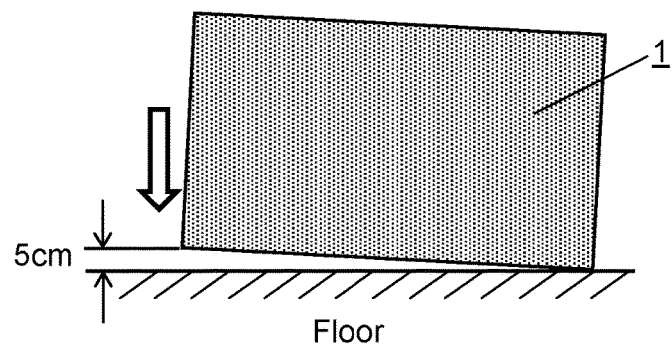
FIG. 5 is a schematic diagram showing how the LCD module is placed on a floor.
Figure 6:
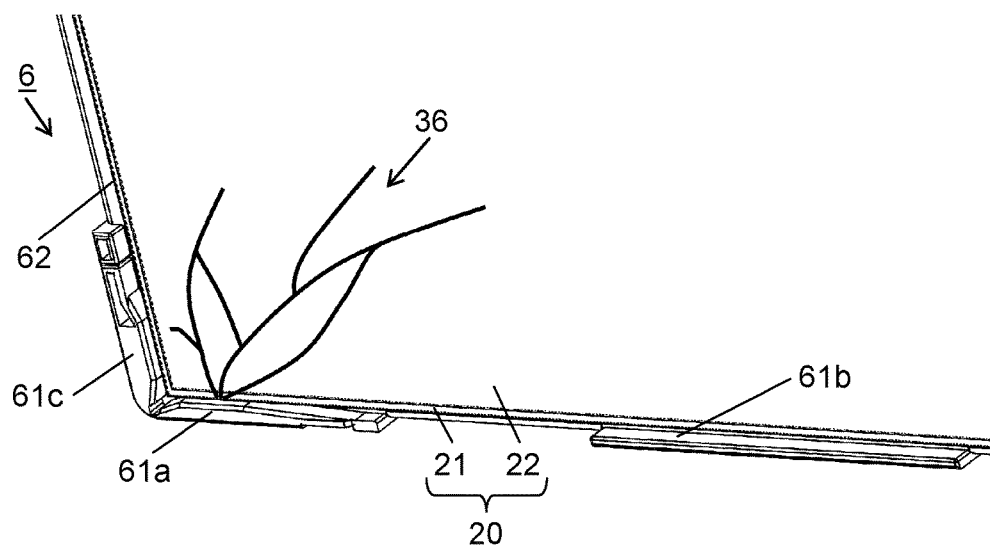
FIG. 6 is a diagram showing glass cracking that can be caused when impact is applied to a corner part of the LCD module.

FIG. 5 is a schematic diagram showing how the LCD module is placed on the floor. FIG. 6 is a diagram showing glass cracking that can be caused when impact is applied to a corner part of the LCD module.

In the case of carrying and installing a 90-inch or larger LCD module or a display including it, this heavy LCD module or the display including it is usually oriented horizontally long and held by two people at both ends.

In the case of putting down the LCD module or the display including it on the floor, the two people can rarely put it down at the same time, and one of them tends to put down one side of it earlier as shown in FIG. 5. Because of this slight difference in timing, when one of the two corner parts (for example, the bottom right corner part) of the LCD module is put down on the floor, the other corner part (for example, the bottom left corner part) is dropped from a height of about 5 cm.

In a 90-inch or larger LCD module with the conventional structure shown in FIG. 6, when the other corner part is dropped as described above, glass cracking 36 often occurs from the contact region between the corner part of cell 20 and guide 61a of mold frame 60 due to the large weight of cell 20.

Figure 7:
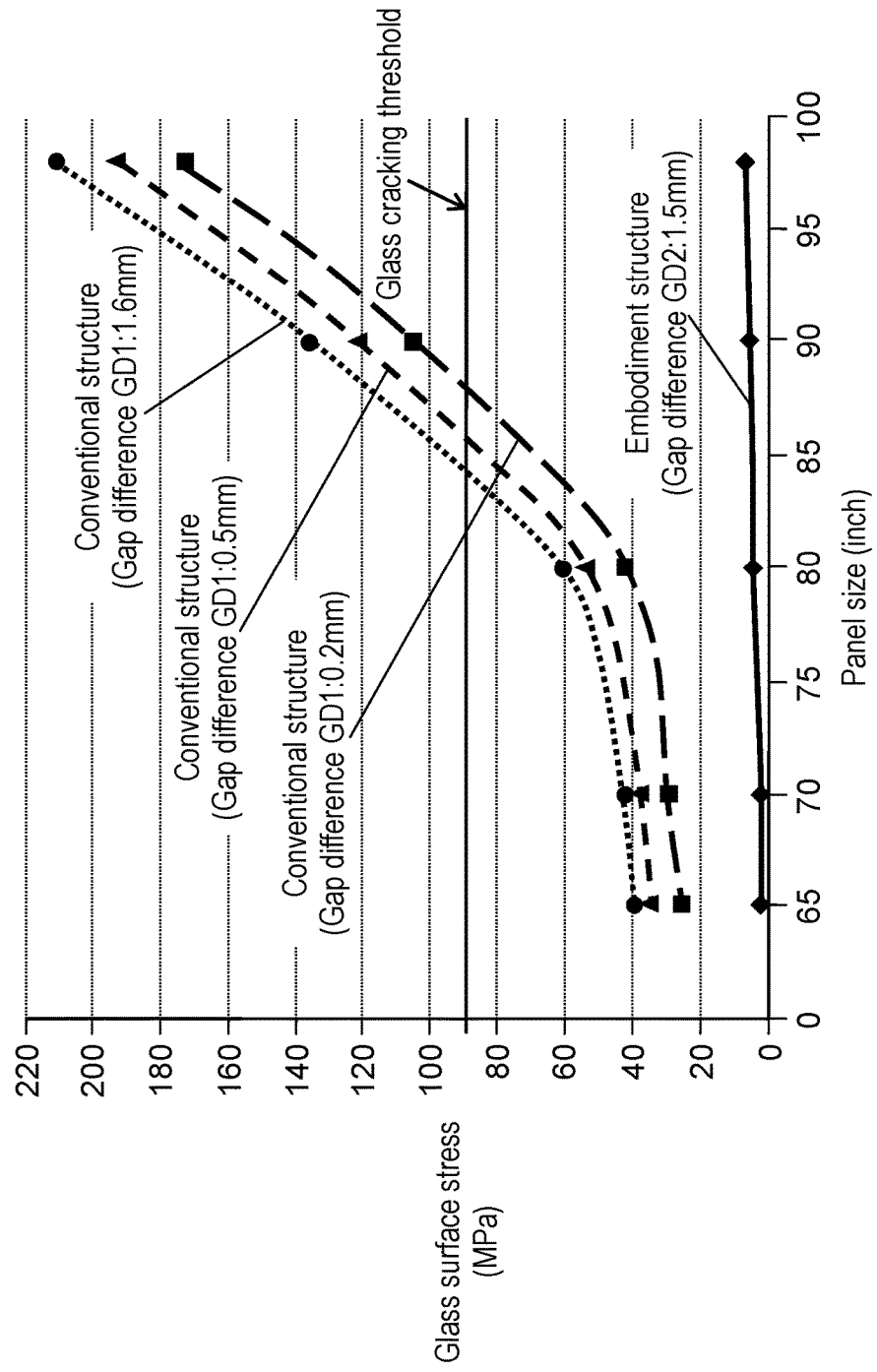
FIG. 7 is a characteristic diagram showing changes in the glass surface stress with respect to the size of the liquid crystal cell in a drop experiment.

FIG. 7 is a characteristic diagram showing changes in the glass surface stress with respect to the size of the liquid crystal cell in a drop experiment. The diagram of FIG. 7 shows the results obtained when LCD module 1 was experimentally dropped from a height of 5 cm as shown in FIG. 5, as is often caused when an LCD module or a display including it is being put down. The horizontal axis represents the panel size (inch) of liquid crystal cell 20, and the vertical axis represents the glass surface stress (MPa) when the LCD module is dropped. The glass cracking threshold is 90 MPa.

The drop experiment shown in FIG. 7 was performed using LCD module 1 shown in FIG. 3A having a gap difference GD2 of 1.5 mm, and conventional LCD modules 6 shown in FIG. 2A having gap differences GD1 of 0.2 mm, 0.5 mm, and 1.6 mm.

As shown above, in the conventional LCD modules, gap 63b at the long-side inner part has a larger gap length than gap 63a at the long-side corner part. As shown in FIG. 7, when the panel size of cell 20 is 65, 70, or 80 inches, the glass surface stress is below the glass cracking threshold, satisfying the drop test standard. When cell 20 is 90 inches or larger, however, all the gap differences GD1 exceed the glass cracking threshold, failing to satisfy the drop test standard. In the conventional structure shown in FIG. 2A, the glass surface stress was not able to be effectively reduced by changing the gap difference GD1. The above-described experimental results indicate that in the conventional structure where the load of liquid crystal cell 20 is supported by guides 61a at the long-side corner parts, it is impossible to greatly reduce the glass surface stress applied when the LCD module is dropped.

In contrast, according to the structure of the present disclosure, the gap between cell 20 and guide 31 of mold frame 30 is larger at the long-side corner part than at the long-side inner part. As a result, as shown in FIG. 7, the glass surface stress applied when the LCD module is dropped can be reduced to be lower than the glass cracking threshold, thereby preventing panel cracking.

Figure 8:
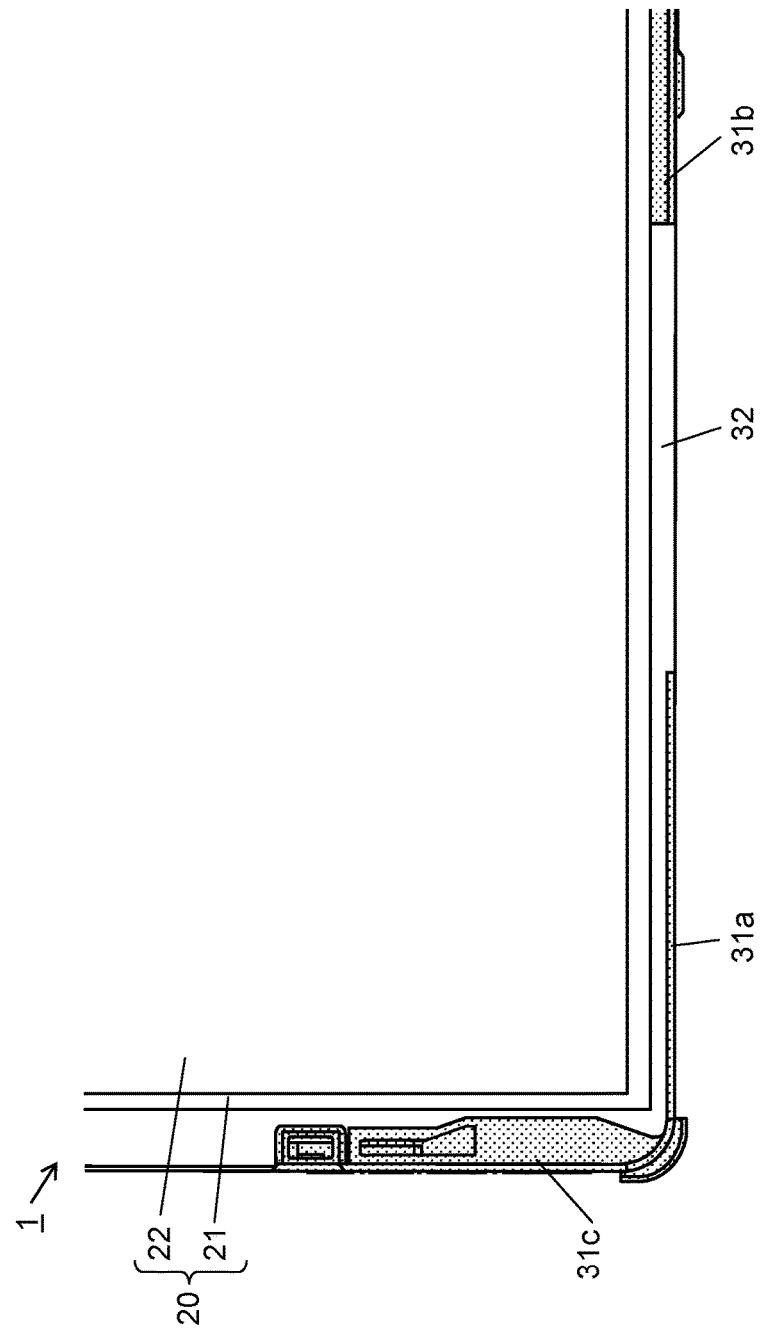
FIG. 8 is a diagram showing the movement of the position of the liquid crystal cell in the drop experiment.

FIG. 8 is a diagram showing the movement of the position of the liquid crystal cell in the drop experiment. In the experiment, LCD module 1 shown in FIG. 3A has a gap difference GD2 of not less than 1.5 mm. The diagram indicates that cell 20 is not in contact with guide 31a at the corner part after being moved by the stress applied when the LCD module is dropped.

This indicates that the load does not concentrate on the corner part of cell 20, but is dispersed to the long-side inner part, thereby preventing glass cracking.

1-3. Effects and Others

As described above, LCD module 1 according to the present disclosure includes liquid crystal cell 20 and mold frame 30 accommodating cell 20. Mold frame 30 includes support 32, which supports cell 20 in the thickness direction of cell 20, and guide 31, which limits the movement of cell 20 in the planar direction of cell 20. Guide 31 includes guide 31a (corner-part guide) facing the long-side corner part of cell 20 and guide 31b (inner-part guide) facing the inner part of the long side. On the long side of cell 20, gap 33a between cell 20 and guide 31a is larger than gap 33b between cell 20 and guide 31b.

The distance from the apex of cell 20 to the inner-part guide is 3 to 9% of the length of the long side of cell 20.

The inner-part guide is divided into a plurality of guides 31. The gap between cell 20 and the corner-part guide facing the corner part is larger than any gap between cell 20 and the plurality of guides 31.

This prevents the corner part of cell 20 from bumping into guide 31 of mold frame 30, thereby reducing the stress concentration on the glass surface. Thus, the load applied to an end surface of cell 20 in LCD module 1 can be dispersed. This allows a liquid crystal display including a large LCD module to be highly rugged against impact that can be applied while the LCD module is being transported or installed.

Other Exemplary Embodiments

The first exemplary embodiment has been described in detail above as a technical example of the present application with reference to the accompanying drawings. The techniques of the present disclosure are not limited to this embodiment and are applicable to other exemplary embodiments provided with modification, replacement, addition, omission, etc. Other exemplary embodiments will now be described as follows.

In the first exemplary embodiment, as shown in FIG. 5, LCD module 1 is assumed to be oriented with the long side horizontally when carried. Therefore, module 1 has a structure where gaps 33a and 33b are formed between cell 20 and each of guides 31b and 31c, respectively, of mold frame 30 on the long side of module 1 so as to deal with dropping or impact in the Y direction. The present disclosure, however, is not limited to this.

LCD module 1 may be oriented with the short side horizontally when held and carried depending on the installation location or other conditions. Therefore, for example, the gap between cell 20 and guide 31c of mold frame 30 may be increased not only at the corner parts of the long side but also at the corner parts of the right and left short sides. In other words, on the short side of cell 20, the gap between cell 20 and the guide at the corner part can be larger than the gap between cell 20 and the guide at the short-side inner part.

Figure 9:
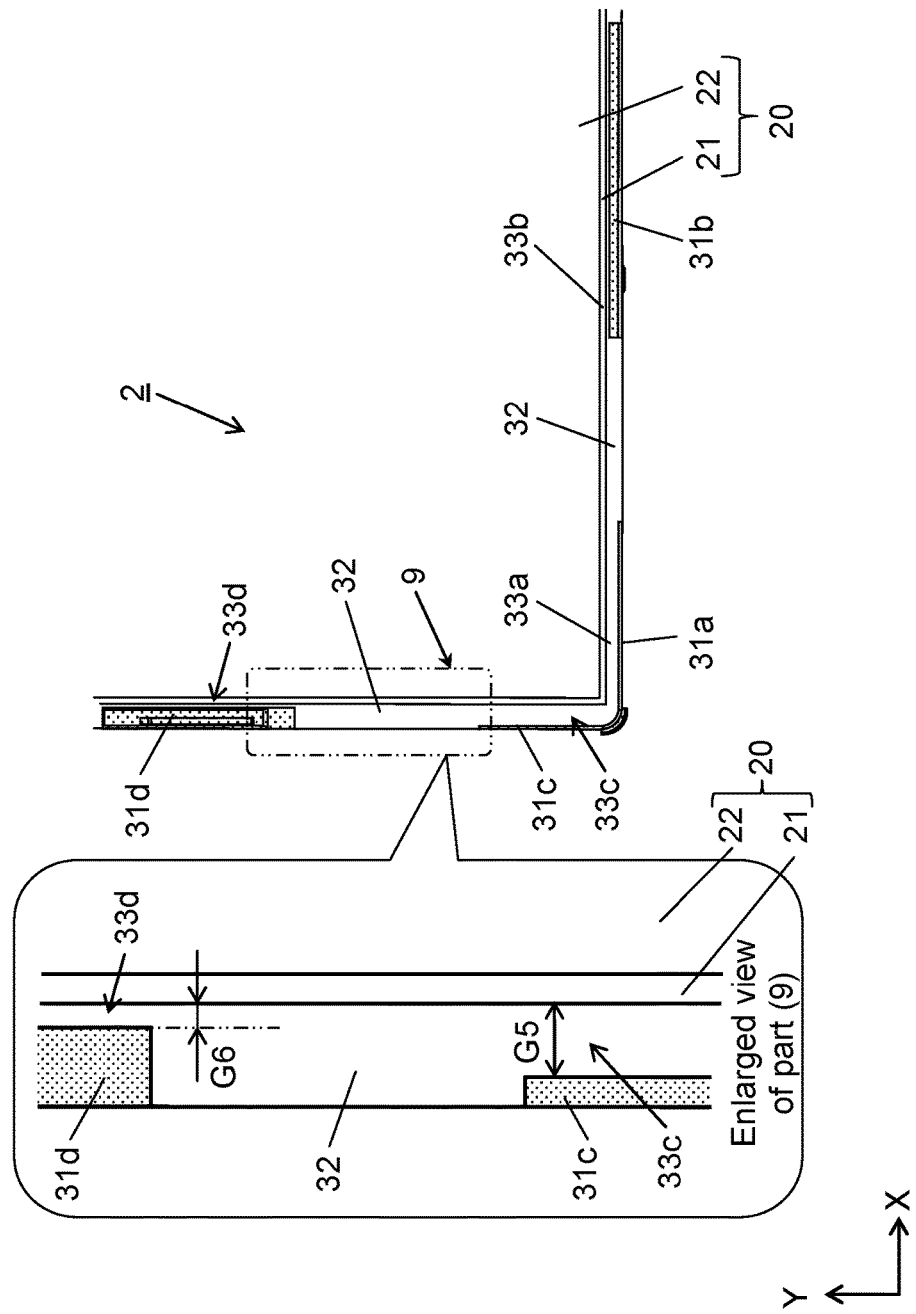
FIG. 9 is a structural diagram of an LCD module according to another exemplary embodiment.

FIG. 9 shows the bottom left part of LCD module 2 and also shows an enlarged view of part (9) of a short side of module 2. As shown in FIG. 9, gap 33d between cell 20 and guide 31d at the short-side inner part has a gap length G6, which is smaller than a gap length G5 of gap 33c between cell 20 and guide 31c at the short-side corner part. This prevents glass cracking starting from the corner part of cell 20 when the LCD module is dropped or subjected to impact in the X direction.

Figure 10:
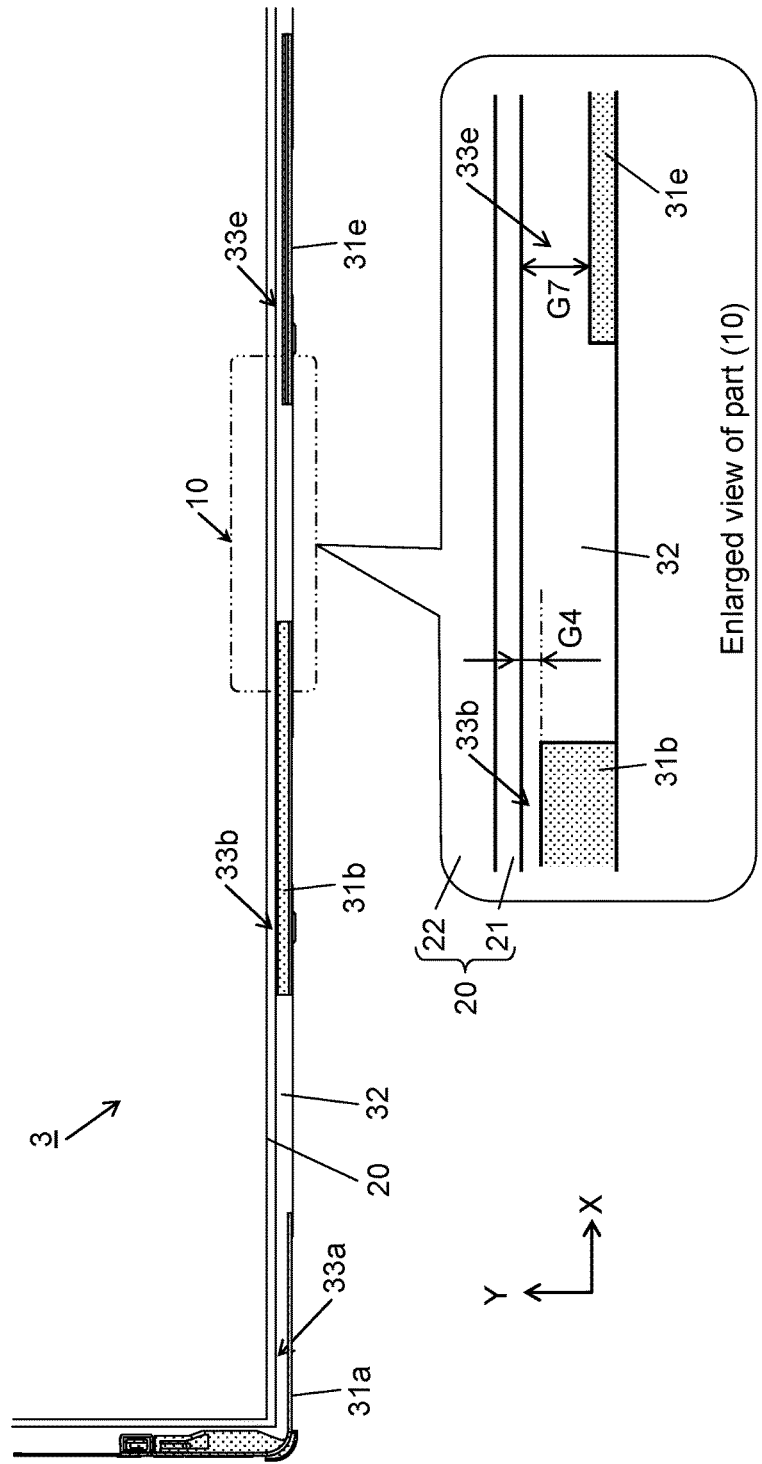
FIG. 10 is a structural diagram of an LCD module according to still another exemplary embodiment.

Each of guide 31b and guide 31d at the inner part shown in FIGS. 3A and 9, respectively, may be divided into a plurality of guides. FIG. 10 shows the bottom left part of LCD module 3 and also shows an enlarged view of part (10) of a long side of module 3. As shown in FIG. 10, guide 31 at the long-side inner part is divided into guides 31b and 31e. Guide 31e is located more inside than guide 31b. Similar to LCD module 1 shown in FIG. 3A, gap 33a between cell 20 and guide 31a at the long-side corner part is larger than gap 33b between cell 20 and guide 31b at the long-side inner part. A gap 33e (gap length G7), which is between cell 20 and guide 31e, is larger than gap 33b (gap length G4) between cell 20 and guide 31b. Gap 33e (gap length G7) is smaller than gap 33a (gap length G3) between cell 20 and guide 31a.

Another plurality of guides 31 may be formed more inside than guide 31e. Gap 33b (gap length G4) of guide 31b adjacent to guide 31a at the long-side corner part is smaller than any other gap (for example, gap 33e) between cell 20 and each guide 31 at the long-side inner part. In other words, gap 33b of guide 31b adjacent to guide 31a at the long-side corner part is smallest of all the gaps between cell 20 and each guide at the long-side inner part. In that case, gap 33a between cell 20 and guide 31a at long-side corner part is larger than any other gap between cell 20 and the plurality of guides 31 facing the long side of cell 20.

Specifically, guide 31 at the long-side inner part is divided into a plurality of guides depending on the positional relationship with PCBs shown in FIG. 1, so that the long-side corner part of cell 20 is supported by two guides 31a and 31b. This prevents glass cracking from starting from the corner part when the LCD module is dropped or subjected to impact in the Y direction.

Although not shown in FIG. 10, the gaps between cell 20 and the guides which are more inside than guide 31e are only required to be larger than the gap length G4 and smaller than the gap length G7, and do not have to have the same gap length. This holds true for the right corner part and the short side of cell 20.

Guide 31 is divided into the plurality of guides 31, but does not have to be. For example, in FIG. 3A, guide 31a and guide 31b are away from each other; alternatively, however, guide 31a may be extended to the guide 31a-side end of guide 31b. In that case, a gap larger than gap 33b between guide 31b and the liquid crystal cell is formed with the predetermined distance L from the end of cell 20.

Furthermore, each of guide 31a at the long-side corner part shown in FIG. 3A and guide 31c at the short-side corner part shown in FIG. 9 is formed as one guide, but may alternatively be divided into a plurality of guides.

INDUSTRIAL APPLICABILITY

The present disclosure is applicable to 65-inch and larger LCD modules. More specifically, the LCD module of the present disclosure is applicable to consumer TVs, industrial monitors, and signage devices including an LCD module.

What is claimed is:
1. An LCD module comprising:
a liquid crystal cell; and
a mold frame accommodating the liquid crystal cell and including:
a support supporting the liquid crystal cell in a thickness direction of the liquid crystal cell; and
a guide for limiting movement of the liquid crystal cell in a planar direction of the liquid crystal cell, the guide including:
a corner-part guide disposed to face a corner part on the corner part of at least one side of the liquid crystal cell; and
an inner-part guide facing an inner part being a part of the side other than the corner part, and being adjacent to the corner-part guide with a gap therebetween so that the inner-part guide and corner-part guide are separated by a distance,
wherein a gap between the liquid crystal cell and the corner-part guide is larger than a gap between the liquid crystal cell and the inner-part guide,
wherein the inner-part guide is divided into a plurality of inner part guides,
wherein a gap between the liquid crystal cell and the inner-part guide adjacent to the corner-part guide is smallest of all gaps between the liquid crystal cell and the plurality of inner part guides, and
wherein the gap between the liquid crystal cell and the corner-part guide is larger than any gap between the liquid crystal cell and the plurality of inner part guides.
2. The LCD module of claim 1, wherein a distance from an apex of the liquid crystal cell to the inner-part guide is 3 to 9% of a length of the at least one side of the liquid crystal cell that faces the inner-part guide.
3. The LCD module of claim 1, wherein the gaps between the liquid crystal cell and the plurality of inner part guides are not equal in length.
4. The LCD module of claim 1, wherein the at least one side of the liquid crystal cell is a long side of the liquid crystal cell.
5. The LCD module of claim 1, wherein the at least one side of the liquid crystal cell is a short side of the liquid crystal cell.
6. An LCD module comprising:
a liquid crystal cell; and
a mold frame accommodating the liquid crystal cell and including:
a support supporting the liquid crystal cell in a thickness direction of the liquid crystal cell; and
a guide for limiting movement of the liquid crystal cell in a planar direction of the liquid crystal cell, the guide including:
a corner-part guide disposed to face a corner part on the corner part of at least one side of the liquid crystal cell; and
an inner-part guide facing an inner part being a part of the side other than the corner part, and being adjacent to the corner-part guide with distance,
wherein a gap between the liquid crystal cell and the corner-part guide is larger than a gap between the liquid crystal cell and the inner-part guide,
the inner-part guide is divided into a plurality of inner part guides in the one side of the liquid crystal cell, and
a gap between the liquid crystal cell and the inner-part guide adjacent to the corner-part guide is smallest of all gaps between the liquid crystal cell and the plurality of inner part guides.

* * * * *